Nov. 10, 1964 P. R. JOSEPHSON ETAL 3,156,534
APPARATUS FOR TREATMENT OF MOLTEN MATERIALS
Filed Aug. 17, 1962
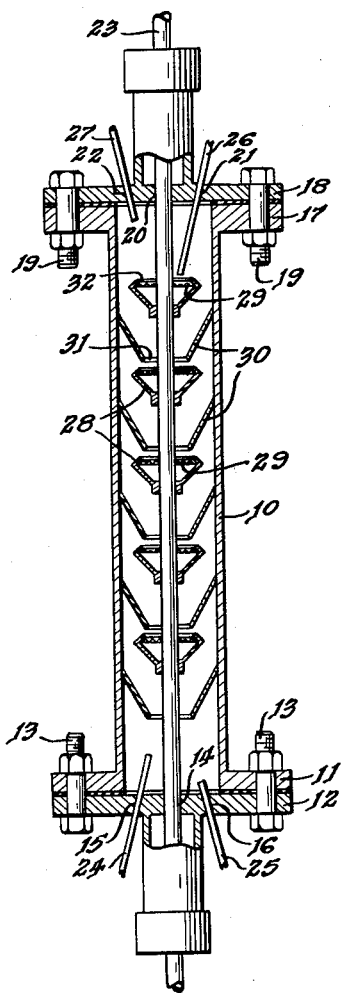
INVENTORS
Paul R. Josephson
Lawrence E. Burkhart
BY
Roland A. Anderson
Attorney

3,156,534
APPARATUS FOR TREATMENT OF MOLTEN MATERIALS

Paul R. Josephson, Rochester, N.Y., and Lawrence E. Burkhart, Ames, Iowa, assignors to the United States of America as represented by the United States Atomic Energy Commission
Filed Aug. 17, 1962, Ser. No. 218,237
4 Claims. (Cl. 23—283)

This invention relates to an apparatus for treating two types of molten materials with each other; the apparatus is usable, for instance, for extracting or otherwise reacting molten metals with molten salts and vice versa.

It is an object of this invention to provide an apparatus for the reaction of molten materials in a plurality of stages, whereby no loss of material occurs during transfer of the materials from one stage to the next.

It is another object of this invention to provide an apparatus for the reaction of molten materials, whereby a particularly thorough contact is accomplished.

It is finally also an object of this invention to provide an apparatus for the reaction of molten materials dissolved into fine droplets, whereby films formed on the surface of said droplets by the reaction are promptly ruptured and removed, so that new surfaces of the reactant are almost continuously exposed and made available for further reaction.

These objects are accomplished by an apparatus being a combination of a vertical column; an inlet and an outlet in the bottom of said column; an inlet and an outlet in the top of said column; a rotatable shaft axially arranged in said column; a plurality of hollow distributor elements attached to said shaft, each of said elements being formed of two truncated cones joined at their widest bases; a plurality of orifices in the periphery of said joined bases; and a plurality of guide funnels attached to the inside of said column wall, one each below each distributor element.

In the attached drawing one specific embodiment of the apparatus of this invention is illustrated.

In this drawing the reference numeral 10 indicates a vertical cylindrical column which has a flange 11 at its lower end. This flange rests on a base or support 12 and is secured thereto by a plurality of screws 13. The support 12 has three bores, a central bore 14 and two side bores 15 and 16. The top of the column is provided with a flange 17 and a cover 18; the cover can be fastened to the flange by means of a plurality of screws 19. The cover 18 has a centrally located bore 20 and two side bores 21 and 22.

A rotatable shaft 23, which can be a rod or a tube, extends through the center bores 14 and 20. In the bottom bore 15 an inlet pipe 24 is arranged and in the bottom bore 16 an outlet pipe 25; likewise, an inlet pipe 26 extends through cover hole 21 and an outlet pipe 27 through cover hole 22.

A plurality of distributor elements 28 are mounted to shaft 23, preferably equally spaced from each other. Each distributor element has the shape of a hollow truncated double cone, joined at the widest surface, the base of each. At the junction periphery of the two hollow cones, a plurality of orifices 29 are arranged. The distributor elements rotate with the shaft when the shaft is activated by a rotating means (not shown).

The column also has arranged in it a plurality of baffle members 30 mounted to the inside wall of the column 10; they function as guide funnels, one each above each distributor element 28. These guide funnels formed by baffle members 30 have bottom discharge openings 31 that are smaller than the upper opening 32 of the distributor elements 28. The column is usually provided with outside heating and cooling means; these are not shown in the drawing, however, for the sake of simplicity.

The operation of the apparatus will now be illustrated by way of example, as applied to the process of the assignee's U.S. Patent No. 2,943,586, granted to Raymond H. Moore on August 9, 1960. Briefly, in that process a solution of neutron-irradiated plutonium- and fission-product-containing uranium-aluminum alloy in molten equimolar potassium chloride-aluminum chloride is to be contacted with molten aluminum metal whereby the dissolved uranium chloride is reduced to uranium metal. A metal phase containing the aluminum and the uranium formed and a salt phase containing the plutonium and most of the fission products in the form of chlorides are obtained.

The material of lesser density, in this case the molten chloride mixture, is always introduced at the bottom through inlet 24 and the heavier material, here the uranium alloy, is introduced through the top inlet 26; by this a countercurrent flow is obtained. The metal flows into the top distributor 28 where, due to the rotation and centrifugal force, it is forced outwardly through the orifices 29 in the form of small droplets, downwardly into the guide funnel and thence into the next lower distributor element. At the same time, by some pressure means not shown, the salt is introduced upwardly through inlet 24. On its upward path, it comes in contact with the finely distributed molten metal. After the materials have passed through all the stages in the column, the metal reaches the bottom of the column and the salt the top of the column. The metal is finally withdrawn through outlet pipe 25, and the salt is withdrawn through outlet pipe 27.

In view of the centrifugal force which throws the metal droplets along a horizontal, radial path and of gravity which makes the metal fall vertically to the next following distributor 28 through the baffle member 30, the path between stages is relatively long and the contact between the two molten materials is especially good. The guide funnels, being arranged directly above the distributor elements and having a smaller discharge opening 31 than the top of the distributor elements, prevent splashing of molten material and thus reduce losses to a minimum.

It will be understood that the apparatus is usable for any other molten materials and other reactions than that just described by way of example.

The column and the various elements thereof can be made of any suitable material known to those skilled in the art. Stainless steel has been found satisfactory for most purposes.

It will also be understood that the invention is not to be limited to the details given herein but that it may be modified within the scope of the appended claims.

What is claimed is:

1. An apparatus for reacting two types of molten materials with each other, comprising: a vertical column; an inlet and an outlet in the bottom of said column; an inlet and an outlet in the top of said column; a rotatable shaft axially arranged in said column; a plurality of hollow distributor elements attached to said shaft and spaced from said column, each of said elements having a decreasing diameter towards each end and the greatest diameter between the ends and having a plurality of orifices in the periphery at a location of greater diameter than those of the two ends; and a plurality of non-perforated guide funnels directly attached to the inside of said column wall, one each below each distributor element, each funnel having the bottom opening concentrically arranged around said shaft as the only passage therethrough.

2. The apparatus of claim 1 wherein the orifices are along the section of the greatest diameter.

3. The apparatus of claim 1 wherein the distributor elements are formed of two truncated cones joined at their widest bases.

4. The apparatus of claim 3 wherein the perforations are located in the periphery of said joined bases.

References Cited in the file of this patent

UNITED STATES PATENTS 2,769,618  Nettel _____ Nov. 6, 1956